Patented Aug. 28, 1945

2,383,500

UNITED STATES PATENT OFFICE 2,383,500

POLISHING COMPOUND

Lincoln M. Polan, Huntington, W. Va., assignor to Albert S. Polan, E. G. Polan, L. M. Polan, Charles Polan, and Lake Polan, Jr., a partnership doing business as Zenith Optical Company, Huntington, W. Va.

No Drawing. Application February 4, 1944,
Serial No. 521,138

10 Claims. (Cl. 51—309)

This invention relates to compositions for use in polishing glass and other hard surfaces.

The general object is to provide a polishing composition which is more efficient and uniform in its action than the compounds heretofore used.

Another object is to provide a novel polishing composition which is slightly alkaline in character.

A further object is to provide a polishing composition utilizing certain cerium oxide as a base in combination with a powdered material which increases the adhesiveness of the oxide and improves the polishing action thereof.

Still another object is to provide a novel process of forming a cerium oxide polishing composition.

Other objects and advantages of the invention will become apparent from the following detailed description.

In the improved composition, the primary polishing or abrading ingredient is finely powdered cerium oxide. Mixed with water, this material may be used with good results in polishing certain types of surfaces. I have discovered that its efficiency as a polishing agent and the range of its usefulness, particularly in polishing glass surfaces such as optical elements, may be increased substantially by combining it with a suitable powdered extending or diluting agent. This agent is an insoluble inorganic compound capable of imparting adhesiveness to the cerium oxide and assisting the latter in its polishing action. Various compounds of the alkaline earth metals including oxides, hydrates, and carbonates may be employed. Barium carbonate is preferred not only because of its comparatively low cost, but also because of the numerous desirable functions which it performs in the presence of cerium oxide. The proportions may be varied considerably within a range of 3 to 5 parts of the oxide and ¾ to 1¼ parts of the carbonate by weight. Best results have been obtained by employing about 4 parts of cerium oxide to 1 part of barium carbonate.

A mixture of cerium oxide and barium carbonate, when dispersed in water to form a mixture of the consistency ordinarily used in polishing hard surfaces, may be slightly alkaline. In order, however, to insure definite alkalinity, a weak alkali such as hydroxide may be added, barium hydrate being preferred in order to avoid the introduction of another metal ion. The amount of the hydrate used is such as to produce a hydrogen ion concentration of between 7 and 9, and preferably about 8, when the oxide and carbonate mixture is diluted to the consistency desired for polishing. By alkalizing the mixture, decomposition of the carbonate is prevented, and by maintaining a low degree of alkalinity, striping or smearing of the surface being polished is avoided.

It is desirable to effect removal from the powdered inorganic ingredients all of the oily foreign material that may be present and introduced, for example, during pulverizing of the ingredients. Such degreasing may be effected in different ways, for example, by heating the ingredients in water in the presence of a coagulating agent. Sodium chloride (NaCl) and bicarbonate (NaHCO₃) are satisfactory for this purpose, the amount used being dependent on the amount of grease present. Two ounces of such a chloride or bicarbonate for each 4 pounds of cerium oxide is usually sufficient. When both chloride and bicarbonate are used, equal parts are preferred. Potassium salts may be used as the coagulating agent.

The polishing compound is prepared in the following manner. After the powdered cerium oxide of the desired fineness has been graded, it is mixed in water with the barium carbonate, barium hydrate, sodium chloride, and sodium bicarbonate in the proportions above set forth, these ingredients being dispersed in a quantity of water sufficient to form a very fluid mixture. One gallon of water for each four pounds of cerium oxide is usually sufficient. The mixture is heated and held at or near boiling until the grease and oil have been coagulated completely by the sodium salts. The insoluble scum thus formed rises to the water surface and is skimmed off periodically. The mixture is allowed to cool, and the supernatant liquid is drawn off. The composition may be stored in the wet or dry state.

In the use of the composition for polishing surfaces such as glass, the composition is dispersed in water to produce a mixture of the desired consistency and having a pH value of about 8. The resulting liquid is agitated frequently and applied to the work and polishing elements in the usual way.

It has been found in practice that the improved composition speeds up the polishing of glass surfaces and enables much greater uniformity in results than is possible with the iron oxide rouge commonly used. Moreover, the polishing of optical elements may be effected by less experienced workmen. The presence of the extending agent or barium carbonate contributes materially to the improved results obtainable. It possesses sufficient adhesiveness to cause the cerium oxide to be held on the polishing block for a longer period of time. It gives more bulk and in effect dilutes or extends the oxide so as to prevent too rapid action by the latter and possible burning or staining of the work. The carbonate also assists the cerium oxide in producing the desired high polish.

I claim as my invention:

1. A polishing composition containing the following ingredients and substantially in the following proportions by weight:

| | Parts |
|---|---|
| Cerium oxide | 32 |
| Barium carbonate | 8 |
| Barium hydroxide | 1 |

2. A polishing composition containing the following ingredients and substantially in the following proportions by weight:

| | Parts |
|---|---|
| Cerium oxide | 12 to 24 |
| Barium carbonate | 3 to 5 |
| Barium hydroxide | ⅜ to ⅝ |

3. A polishing composition including 3 to 5 parts by weight of barium carbonate and 12 to 24 parts by weight of cerium oxide.

4. A polishing composition comprising a mixture of approximately four parts of powdered cerium oxide, one part of powdered barium carbonate, and a lesser quantity of barium hydrate.

5. A polishing composition comprising a mixture of powdered cerium oxide and a powdered carbonate of an alkaline earth metal.

6. A polishing composition comprising powdered cerium oxide, a lesser amount of an alkaline earth carbonate, and an alkalizing ingredient.

7. A polishing liquid comprising cerium oxide and the carbonate of an alkaline earth metal dispersed in an aqueous solution having a pH value between seven and nine.

8. A polishing liquid comprising cerium oxide and the carbonate of an alkaline earth metal dispersed in a slightly alkaline aqueous solution.

9. In the process of preparing a cerium oxide polishing composition, the step of boiling a water mixture of the powdered oxide in the presence of material capable of precipitating out any grease or oil contained on the oxide particles.

10. In the process of preparing a cerium oxide polishing composition, the step of removing grease from the oxide.

LINCOLN M. POLAN.